(12) United States Patent
Hunter

(10) Patent No.: US 12,247,626 B2
(45) Date of Patent: Mar. 11, 2025

(54) WELL SERVICING PUMP SYSTEM WITH DRIVELINE ASSEMBLY FOR HYDRAULIC FRACTURING SYSTEM

(71) Applicant: Halliburton Energy Services, Inc., Houston, TX (US)

(72) Inventor: Timothy Holiman Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 52 days.

(21) Appl. No.: 18/150,478

(22) Filed: Jan. 5, 2023

(65) Prior Publication Data
US 2024/0229870 A1    Jul. 11, 2024

(51) Int. Cl.
*F16D 11/14* (2006.01)
*E21B 43/26* (2006.01)
(Continued)

(52) U.S. Cl.
CPC .......... *F16D 11/14* (2013.01); *E21B 43/2607* (2020.05); *F04B 1/0404* (2013.01);
(Continued)

(58) Field of Classification Search
CPC ............... F16D 11/14; F16D 2011/002; F16D 2011/006; E21B 43/2607; F04B 1/0404;
(Continued)

(56) References Cited

U.S. PATENT DOCUMENTS 2,733,793 A * 2/1956 Couse .................... F16D 21/02
192/48.7
8,506,267 B2    8/2013 Gambier et al.
(Continued)

FOREIGN PATENT DOCUMENTS

WO    WO-2020122752 A1 * 6/2020 ............. E21B 17/02

OTHER PUBLICATIONS wikipedia.org; Universal joint—Wikipedia, which is a screenshot of wikipedia.org/wiki/Universal_joint from web.archive.org/web/20191208012426/https://en.wikipedia.org/wiki/Universal_joint (Year: 2019).*

*Primary Examiner* — David N Brandt
(74) *Attorney, Agent, or Firm* — K&L Gates LLP

(57) ABSTRACT

A driveline assembly for use with a well-servicing pump system is disclosed. The driveline assembly comprises a stub shaft attachable to one of a pump or a motor, a flange shaft attachable to the other of the pump or the motor, and a coupling assembly comprising a drive-transfer cylinder and a spring-loaded locking sleeve. In a drivingly-engaged position, rotary drive motion of the motor is transferred to the pump. In an unlocked position, the locking sleeve allows the drive-transfer cylinder to move axially from the drivingly-engaged position where the drive-transfer cylinder connects and transfers rotary drive between the flange shaft and the stub shaft to the drivingly-disengaged position where the drive-transfer sleeve disconnects and allows relative rotation between the flange shaft and the stub shaft. In a locked position, the locking sleeve locks the drive-transfer cylinder in one of either the drivingly-engaged position or the drivingly-disengaged position.

5 Claims, 11 Drawing Sheets

(51) Int. Cl.
  *F04B 1/0404*   (2020.01)
  *F04B 9/02*    (2006.01)
  *F04B 53/00*   (2006.01)
  *F04B 53/22*   (2006.01)
  *F16D 11/00*   (2006.01)

(52) U.S. Cl.
  CPC ............... *F04B 9/02* (2013.01); *F04B 53/006* (2013.01); *F04B 53/22* (2013.01); *F16D 2011/002* (2013.01); *F16D 2011/006* (2013.01); *Y10T 403/7031* (2015.01); *Y10T 403/7033* (2015.01)

(58) Field of Classification Search
  CPC .......... F04B 9/02; F04B 53/006; F04B 53/22; Y10T 403/7031; Y10T 403/7033
  See application file for complete search history.

(56) References Cited

U.S. PATENT DOCUMENTS

| | | |
|---|---|---|
| 9,395,049 B2 | 7/2016 | Vicknair et al. |
| 9,556,721 B2 | 1/2017 | Jang et al. |
| 9,562,420 B2 | 2/2017 | Morris et al. |
| 10,378,326 B2 | 8/2019 | Morris et al. |
| 11,168,554 B2 | 11/2021 | Morris et al. |
| 2009/0068031 A1 | 3/2009 | Gambier et al. |
| 2019/0203572 A1* | 7/2019 | Morris .................... F04B 23/04 |
| 2019/0277295 A1 | 9/2019 | Clyburn et al. |
| 2020/0040878 A1 | 2/2020 | Morris |
| 2021/0340973 A1* | 11/2021 | Nagler .................. F04B 49/065 |

\* cited by examiner

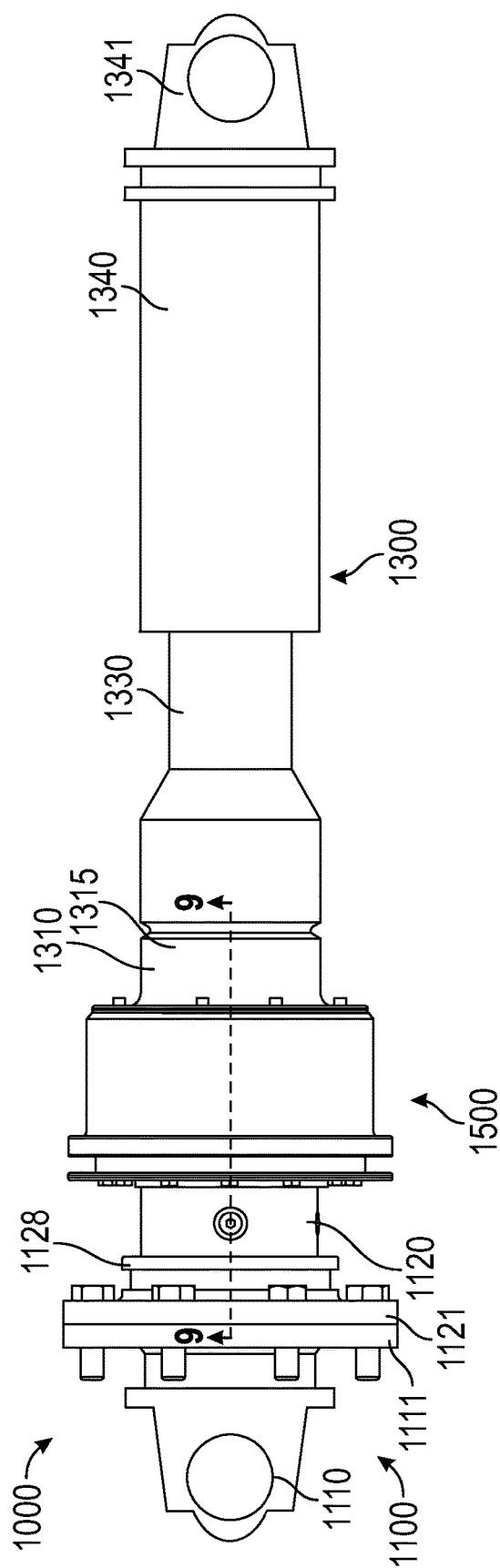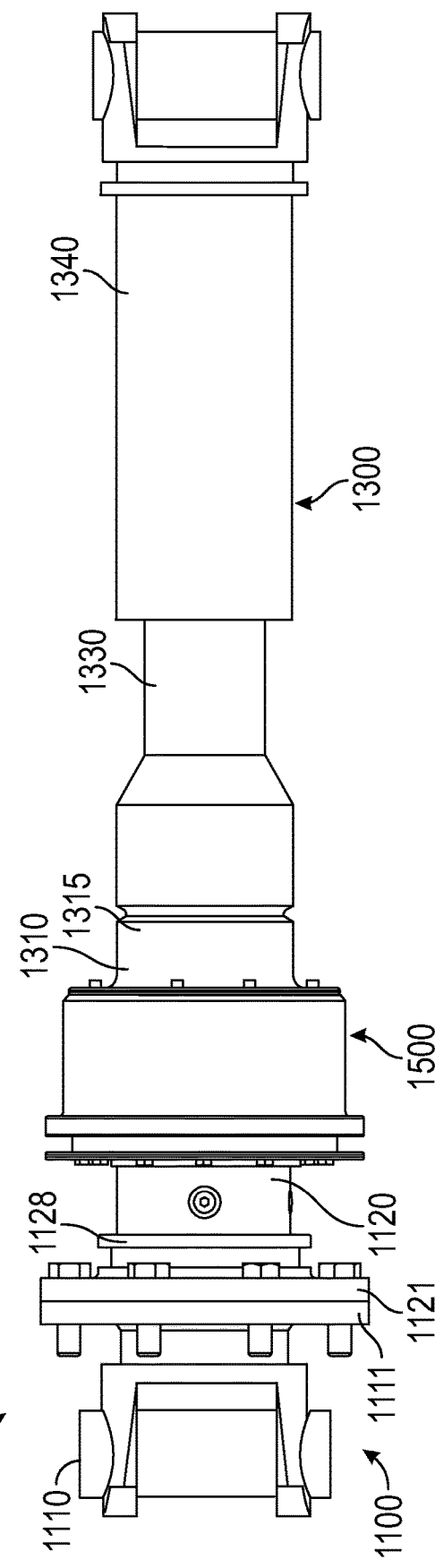

WELL SERVICING PUMP SYSTEM WITH DRIVELINE ASSEMBLY FOR HYDRAULIC FRACTURING SYSTEM

BACKGROUND

Hydraulic fracturing requires well-servicing pumping systems to pump fluid and fluid mixtures into and out of a well bore. The pumping systems require a pump and a motor to drive the pump. In various instances, disconnecting rotary drive motion to the pump from the motor is required. In systems where multiple pumps are driven by a single, double-ended motor shaft, one of the pumps may fail and/or need to be shut down and, traditionally, the entire pumping system would need to be shut down to service the pump.

Driveline assemblies are disclosed to be used between a pump and a motor of a hydraulic fracturing system. The driveline assemblies include an integrated coupling assembly which enables an operator to quickly couple and decouple the pump from the motor while permitting the motor to run, for example. In systems where multiple pumps are driven by a single motor, the entire system need not be shut down because drive motion from the motor to a failed pump can be decoupled while the motor operates another pump, discussed in detail below.

BRIEF DESCRIPTION OF THE DRAWINGS

Embodiments of the WELL SERVICING PUMP SYSTEM WITH DRIVELINE ASSEMBLY FOR HYDRAULIC FRACTURING SYSTEM are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIG. 4 is a side view of a driveline assembly comprising an input shaft assembly, an output shaft assembly, and a coupling assembly configured to selectively couple and decouple the input shaft assembly and the output shaft assembly;

FIG. 5 is a top view of the driveline assembly of FIG. 4;

DETAILED DESCRIPTION

The present disclosure describes a pumping system for use in hydraulic fracturing. The pumping system comprises an input motor and at least one pump driven by the input motor. The pumping system further comprises a driveline assembly configured to transfer rotary drive motion from the input motor to the pump. The driveline assembly comprises, among other things, an input shaft assembly configured to be driven by the input motor, an output shaft assembly configured to drive the pump, and a coupling assembly configured to selectively couple and decouple the input shaft assembly and the output shaft assembly, as discussed below.

The coupling assembly is provided to allow for selective coupling and decoupling of the pump and the input motor. When coupled, the coupling assembly is in a drivingly-engaged position and rotary motion is transferred from the input motor to the pump. When decoupled, the coupling assembly is in a drivingly-disengaged position and rotary motion is inhibited from being transferred from the input motor to the pump while the motor is running, for example. In at least one instance, the coupling assembly is utilized during servicing of the pump and/or input motor, for example. In such an instance, the coupling assembly can be actuated by an actuator to decouple the input shaft assembly and the output shaft assembly. In at least one instance, multiple coupling assemblies are utilized to selectively decouple one or more pumps from a single motor. A coupling assembly can be employed for each pump to permit the decoupling of one pump from the motor while another pump remains operational.

Figure 1:
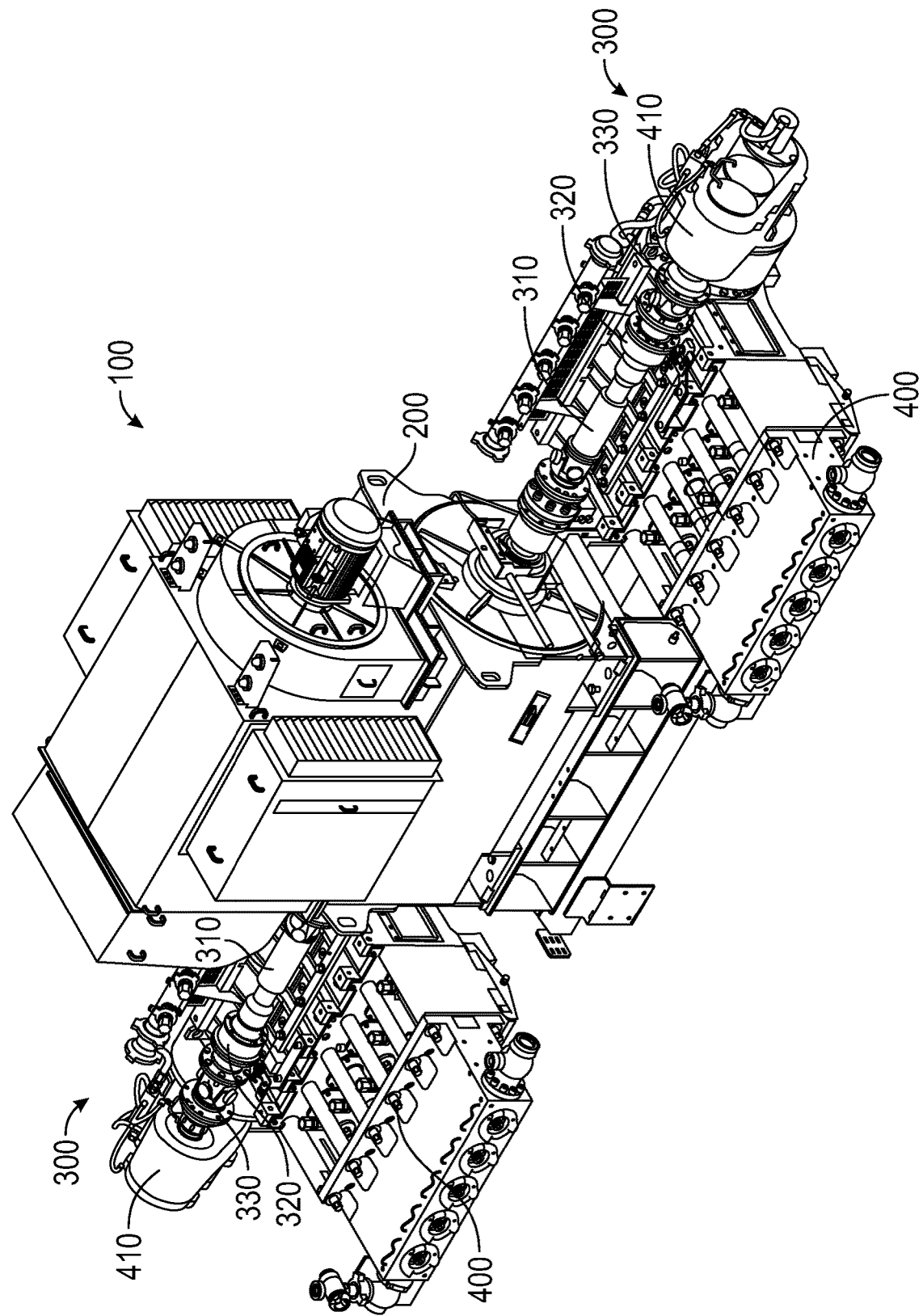
FIG. 1 is a perspective view of a pumping system comprising multiple pumps, a motor, and two driveline assemblies configured to transfer rotary drive motion from the motor to each of the pumps, wherein each driveline assembly comprises a coupling assembly configured to selectively couple and decouple a pump from the motor.
Figure 2:
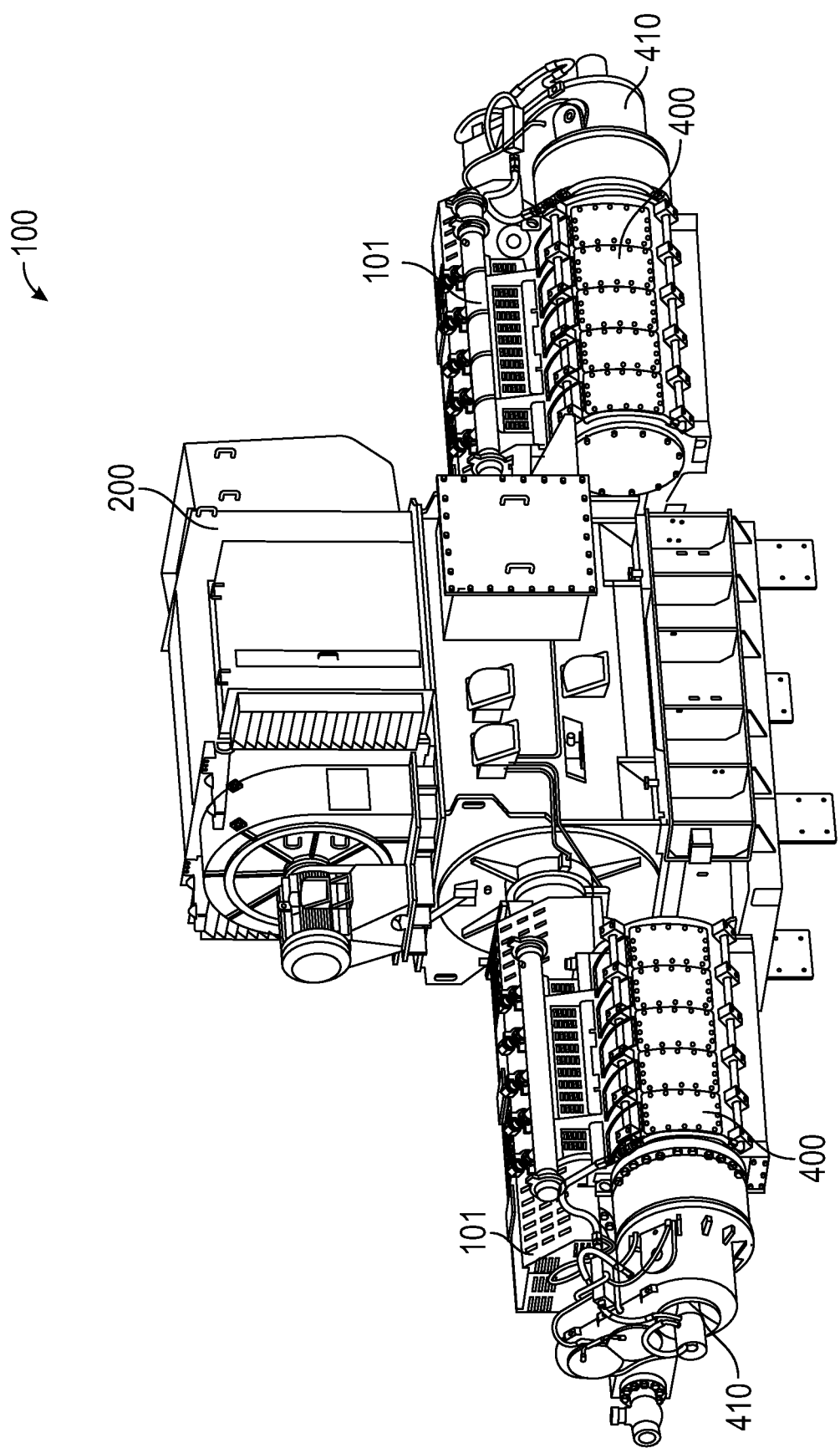
FIG. 2 is another perspective view of the pumping system of FIG. 1, wherein the pumping system further comprises a frame housing surrounding the driveline assemblies.
Figure 3:
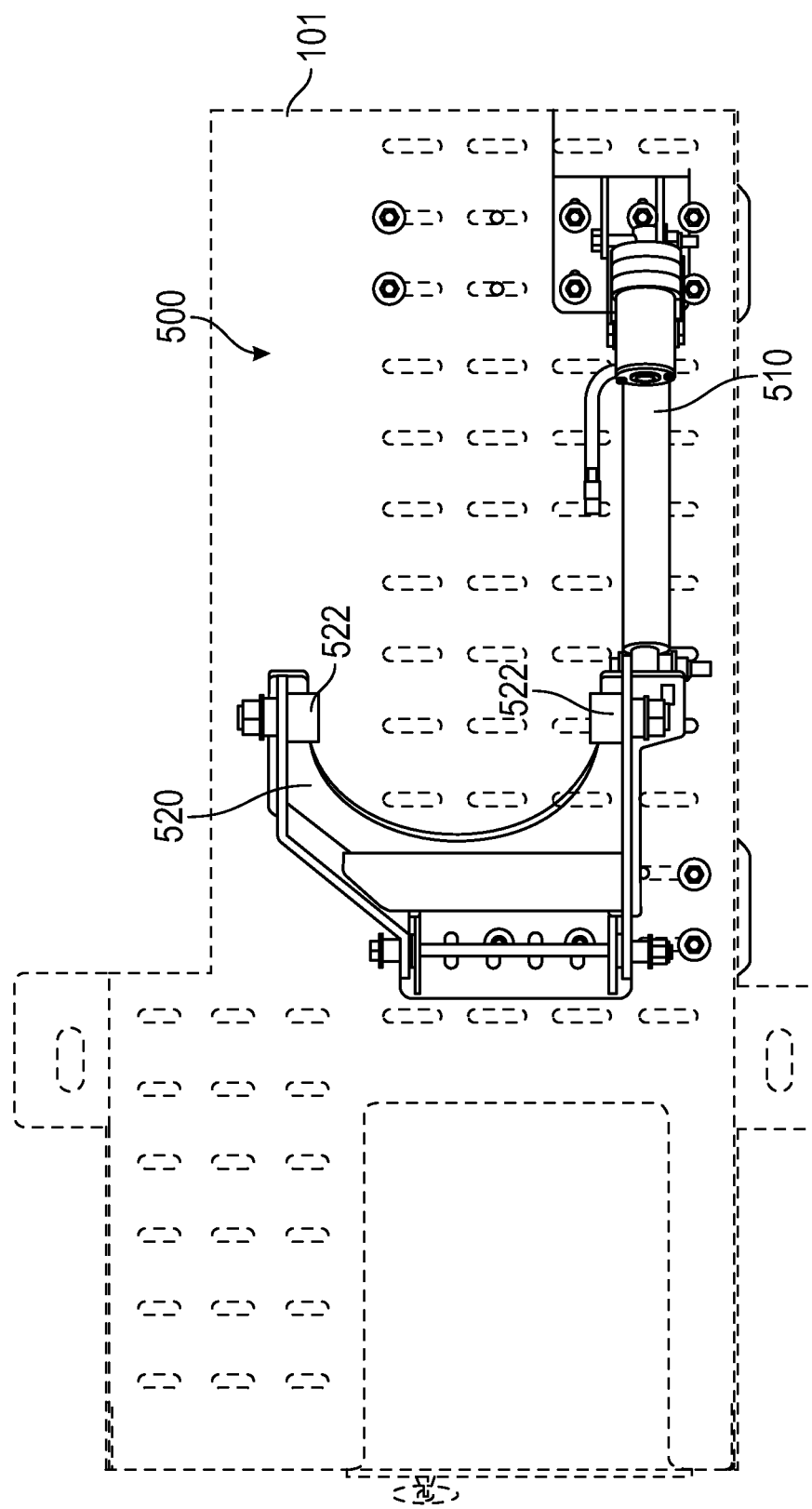
FIG. 3 is a bottom view of an actuator assembly of the pumping system of FIG. 1, wherein the actuator assembly is mounted to the frame housing of the pumping system and comprises a linear actuator and an actuator arm movable by the linear actuator, wherein the actuator assembly is configured to move the coupling assembly between a drivingly-engaged position and a drivingly-disengaged position.
Figure 6:
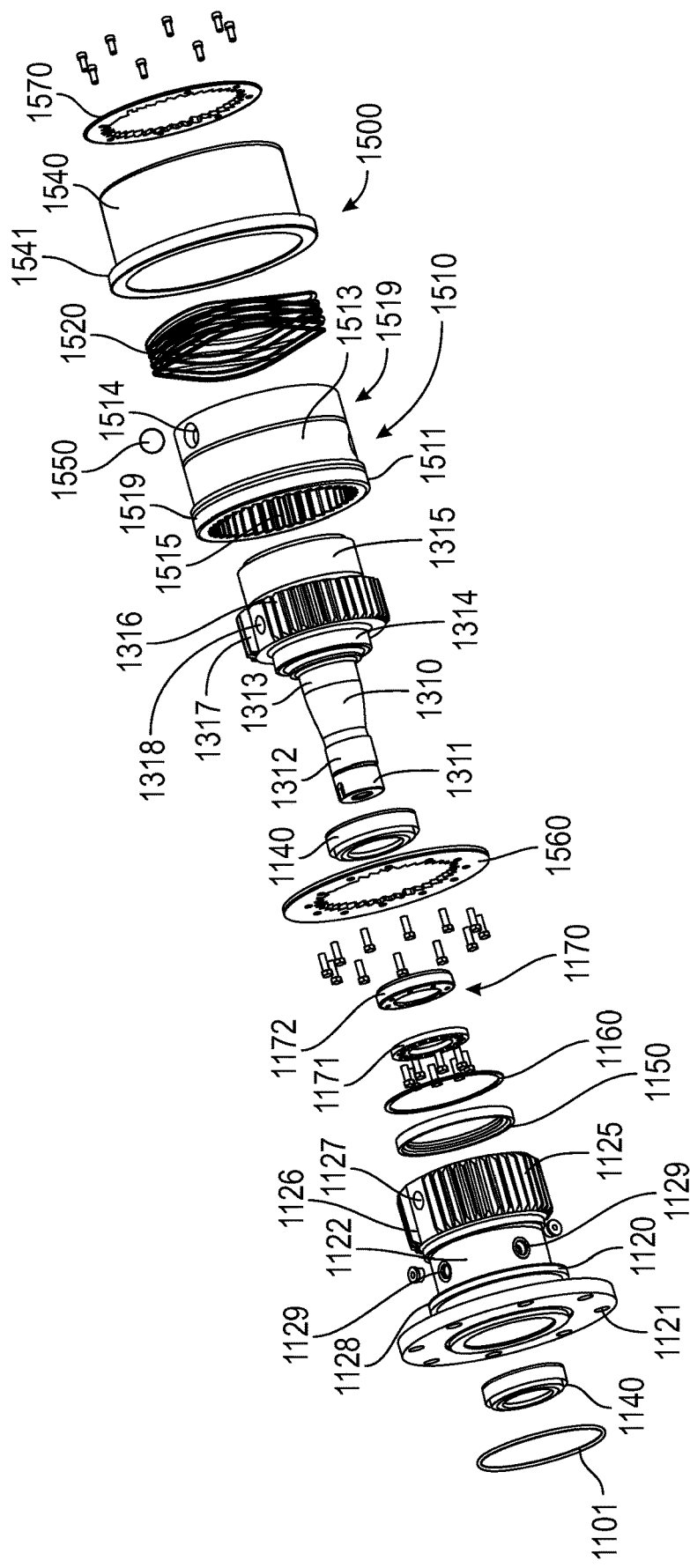
FIG. 6 is an exploded view of the driveline assembly of FIG. 4, wherein the input shaft assembly comprises a flanged shaft and the output shaft assembly comprises a stub shaft.

Turning now the figures, FIGS. 1-3 depict a pumping system 100 for use in hydraulic fracturing. In at least one instance, the pumping system 100 is contained on a pumping truck trailer, for example. The pumping system 100 comprises an input motor 200, driveline assemblies 300, and pumps 400. The input motor 200 drives the pumps 400 by way of the driveline assemblies 300. In at least one instance, the input motor comprises any suitable type of motor such as, for example, a combustion engine, an electric motor, and/or a hydraulic motor for example. Each pump 400 comprises a gearing assembly 410 configured to transfer rotary drive motion from the driveline assembly 300 to the pump 400.

Each driveline assembly 300 is configured to transfer rotary drive motion from the input motor 200 to the gearing assemblies 410. Each driveline assembly 300 comprises an input shaft assembly 310 attached to and driven by the motor 200, an output shaft assembly 330 attached to and configured to drive the pump 400, and a coupling assembly 320 configured to selectively couple and decouple the input shaft assembly 310 and the output shaft assembly 330. In at least one instance, the driveline assemblies comprise universal joints at each end to permit a degree of misalignment between the motor and the pump.

The coupling assembly 320 is movable between a drivingly-engaged position where rotary drive motion is transferred from the input shaft assembly 310 to the output shaft assembly 330 and a drivingly-disengaged position where relative rotation between the input shaft assembly 310 and the output shaft assembly 330 is permitted and the motor 200 cannot drive the pump 400.

Referring primarily to FIGS. 2 and 3, the pumping system 100 further comprises at least one actuator assembly 500 mounted to a frame housing 101 of the pumping system 100. The actuator assembly 500 is configured to move the coupling assembly 320 between the drivingly-engaged position and the drivingly-disengaged position, discussed in detail below. The actuator assembly 500 comprises a linear actuator 510 attached to the frame housing 101 and an actuator arm 520 pivotably mounted to the frame housing 101 and the linear actuator 510. In at least one instance, the actuator arm 520 comprises a yoke. The linear actuator 510 is configured to pivot the actuator arm 520 to move the coupling assembly 320 between the drivingly-engaged position and the drivingly-disengaged position. The actuator arm 520 comprises actuation nubs 522 extending from the actuator arm 520 which are configured to engage the coupling assembly 320. In at least one instance, the actuation nubs 522 comprise a cylindrical shape and are rotatably mounted to the arm 520 to permit rotation of the nubs 522 relative to the arm 520 as the nubs 522 engage the coupling assembly 320.

The coupling assembly 320 may be actuated by any suitable means. In at least one instance, the coupling assembly 320 is actuated manually without an actuator assembly 500. In at least one instance, the coupling assembly 320 is actuated manually with the actuator assembly 500. In at least one instance, the actuator assembly 500 is remotely and/or wirelessly activated, for example. In at least one instance, the actuator assembly 500 is automatically activated upon the detection of an emergency situation such as, for example, an over-torque event. The linear actuator 510 may comprise any suitable type of linear actuator such as, for example, a hydraulic actuator, a pneumatic actuator, and/or an electro-mechanical actuator.

In at least one instance, the driveline assemblies disclosed herein can be flipped in either orientation. More specifically, regarding the driveline assemblies 300, the input shaft assembly 310 can be connected to the pump and the output shaft assembly 330 can be connected to the motor. In such an instance, the input shaft assembly 310 becomes the output shaft assembly coupled to and configured to drive the pump and the output shaft assembly 330 becomes the input shaft assembly coupled to and driven by the motor. To this end, the driveline assembly discussed in connection with FIGS. 4-13 is the driveline assembly 300 described in a flipped orientation. FIGS. 4-13 depict an example driveline assembly 1000 for use with a pumping system such as those described herein. The driveline assembly 1000 is configured to selectively transmit rotary drive motion from an input source such as a motor, for example, to an output source such as a pump, for example. The driveline assembly 1000 comprises an input shaft assembly 1100 configured to be driven by a motor, an output shaft assembly 1300 configured to drive a pump, and a coupling assembly 1500 configured to selectively couple and decouple the input shaft assembly 1100 and the output shaft assembly 1300. As discussed above, the driveline assembly 1000 is flipped as compared to the driveline assemblies 300. The shaft assembly 1100 (which is similar to the output shaft assembly 330) is being described as the "input" shaft assembly and the shaft assembly 1300 (which is similar to the input shaft assembly 310) is being described as the "output" shaft assembly for simplicity. In at least one instance, the shaft assembly 1100 is utilized as the output shaft assembly and the shaft assembly 1300 is utilized as the input shaft assembly.

The input shaft assembly 1100 comprises a universal joint 1110 and flange 1111. The universal joint 1110 is configured to be driven by a corresponding joint portion of a motor output, for example. In at least one instance, the universal joint 1110 comprises a Cardan universal joint, for example. The input shaft assembly 1100 further comprises a hollow flange shaft 1120 comprising a flange 1121 and primary body portion 1122 extending from the flange 1121. The flange 1121 is attached to the flange 1111 and, as a result, as the universal joint 1110 is rotated by the motor, the hollow flange shaft 1120 is rotated. The hollow flange shaft 1120 further comprises driving teeth 1125 formed on an outer end surface of the primary body portion 1122. Discussed in detail below, the hollow flange shaft 1120 further comprises a locking detent 1127 positioned within a slot 1126 to engage the coupling assembly 1500. The hollow flange shaft 1120 further comprises fluidic access ports 1129 defined in the primary body portion 1122 to access a fluid chamber inside the flange shaft 1120. The ports 1129 can be used to insert lubrication into the hollow flange shaft 1120. In at least one instance, multiple ports 1129 are distributed at 90-degree increments around the flange shaft 1120.

Figure 7:
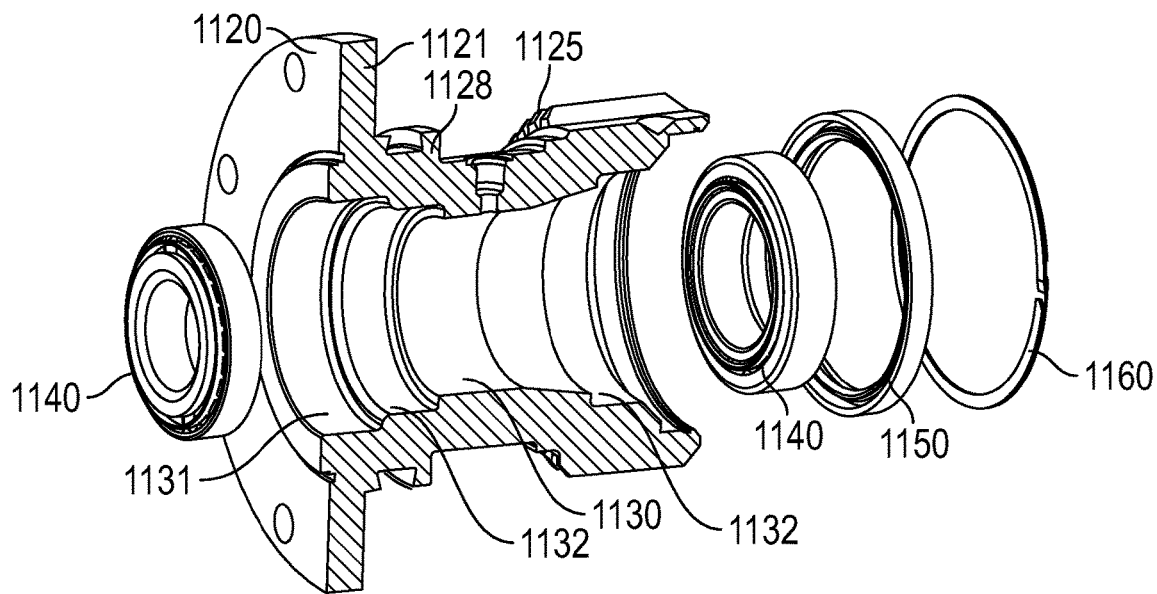
FIG. 7 is an exploded and partial cross-sectional view of the flange shaft of the driveline assembly of FIG. 4.
Figure 8:
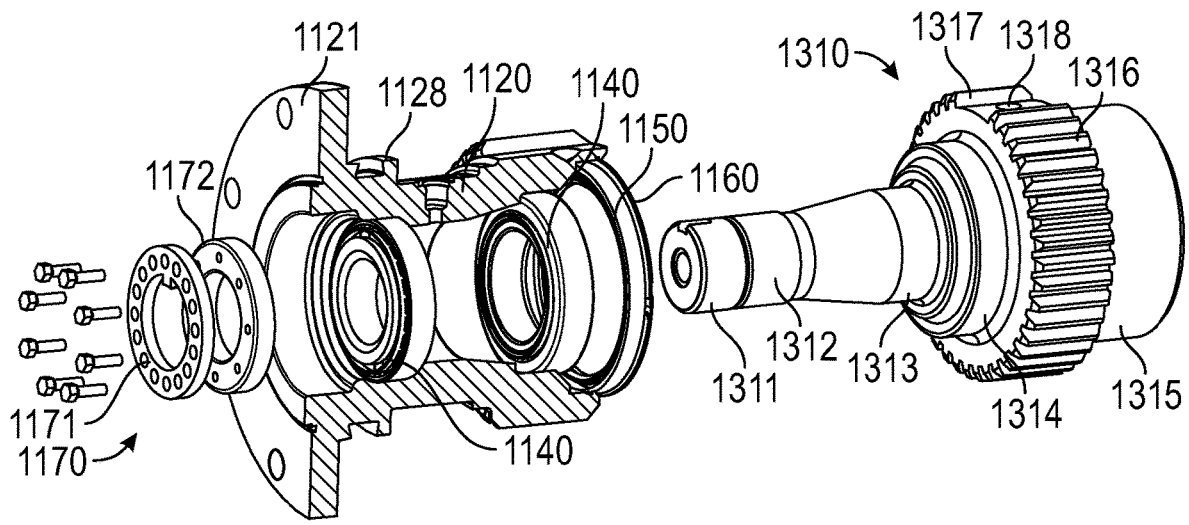
FIG. 8 is an exploded and partial cross-sectional view of the flange shaft and the stub shaft of the driveline assembly of FIG. 4.

Referring to FIGS. 7 and 8, the flange shaft 1120 further comprises a hollow core 1130 defined therein and configured to receive a stub shaft 1310 of the output shaft assembly 1300. The hollow core 1130 comprises an outer bore section 1131 and bearing surfaces 1132. The outer bore section 1131 is configured to receive a locking mechanism 1170 to set a bearing preload, for example. The locking mechanism 1170 comprises a notched locking nut 1171 and a locking washer 1172. The locking mechanism 1170 is configured to set a bearing preload for bearings 1140 engaged with the bearing surfaces 1132. In at least one instance, the bearings 1140 may comprise tapered rolling bearings, for example. However, any suitable bearings can be used. The bearings 1140 permit relative rotation between the flange shaft 1120 and the stub shaft 1310, as discussed in detail below. Specifically, the stub shaft 1310 is receivable and journably supportable in the hollow core 1130 relative to the flange shaft 1120 by the bearings 1140.

Referring to FIG. 8, the stub shaft 1310 is configured to be received within the hollow core 1130 of the flange shaft 1120. The hollow core 1130 is sealed by way of sealing ring 1101 between the flange 1121 and the flange 1111 and the annular sealing component 1150 held within the hollow core 1130 by retention ring 1160. The stub shaft 1310 comprises an end 1311, a bearing surface 1312, a bearing surface 1313, and a sealing surface 1314. The locking mechanism 1170 is positioned on the end 1311. The bearings 1140 are positioned at the bearing surfaces 1312, 1313. The sealing component 1150 is positioned on the sealing surface 1314. The stub shaft 1310 further comprises an end 1315 comprising driving teeth 1316 formed thereon. Discussed in detail below, rotary motion is selectively transmitted between the flange shaft 1120 and the stub shaft 1310 through the teeth 1125 and teeth 1316 with the coupling assembly 1500. The stub shaft 1310 further comprises a locking detent 1318 formed in slot 1317 configured to engage the coupling assembly 1500.

The output shaft assembly 1300 further comprises a drive shaft 1330 fixedly attached to the end 1315 of the stub shaft 1310 and a tubular shaft 1340 drivingly-engaged with the drive shaft 1330. The drive shaft 1330 is permitted to slide relative to the tubular shaft 1340 to permit a degree of longitudinal travel while maintaining rotary driving engagement between the tubular shaft 1340 and the drive shaft 1330. In at least one instance, the tubular shaft 1340 and the drive shaft 1330 comprise a spline and slot arrangement such that the drive shaft 1330 can telescopingly move axially within the tubular shaft 1340. The tubular shaft 1340 further comprises a universal joint 1341 configured to be coupled to a corresponding joint portion of a pump drive. In at least one instance, the drive shaft 1330 is welded to the drive shaft 1340. In at least one instance, the universal joint 1341 comprises a Cardan universal joint.

The coupling assembly 1500 is configured to selectively, rotationally lock and unlock the flange shaft 1120 and the stub shaft 1310 to each other so that rotary drive motion is, one, transmitted from the flange shaft 1120 to the stub shaft 1310 and so that, two, rotary drive motion is not transmitted from the flange shaft 1120 to the stub shaft 1310, respectively. Referring primarily to FIGS. 6 and 9-13, the coupling assembly 1500 comprises a drive-transfer cylinder, or collar, 1510 and a spring-loaded locking sleeve, or collar, 1540. The drive-transfer cylinder 1510 comprises a flanged end 1511 and a primary body portion 1513. The drive-transfer cylinder 1510 further comprises coupler driving teeth 1515 formed therein which are configured to mesh with the teeth 1125 and the teeth 1316. The drive-transfer cylinder 1510 is movable between a drivingly-engaged position where the coupler driving teeth 1515 are engaged with the teeth 1125 and the teeth 1316 to transmit rotary motion therebetween and a drivingly-disengaged position where the coupler driving teeth 1515 do not meshingly couple the teeth 1125 and teeth 1316.

The spring-loaded locking sleeve 1540 comprises a flanged end 1541 and a body portion 1542. The spring-loaded locking sleeve 1540 is spring-loaded against the flanged end 1511 of the drive-transfer cylinder 1510 by way of spring 1520. The body portion 1542 comprises driving annular tab 1543 against which the spring 1520 pushes. Discussed in detail below, the spring-loaded locking sleeve 1540 is configured to be moved toward the flange end 1511 to compress the spring 1520 with the driving annular tab 1543 against the flange end 1511 and to move the spring-loaded locking sleeve 1540 into an unlocked position. When the spring 1520 is not compressed, the spring-loaded locking sleeve 1540 is biased toward the fully extended, or locked, position. The spring 1520 is isolated by sealing rings 1519. In at least one instance, the spring 1520 comprises a wave spring. However, any suitable type of spring can be used.

Figure 9:
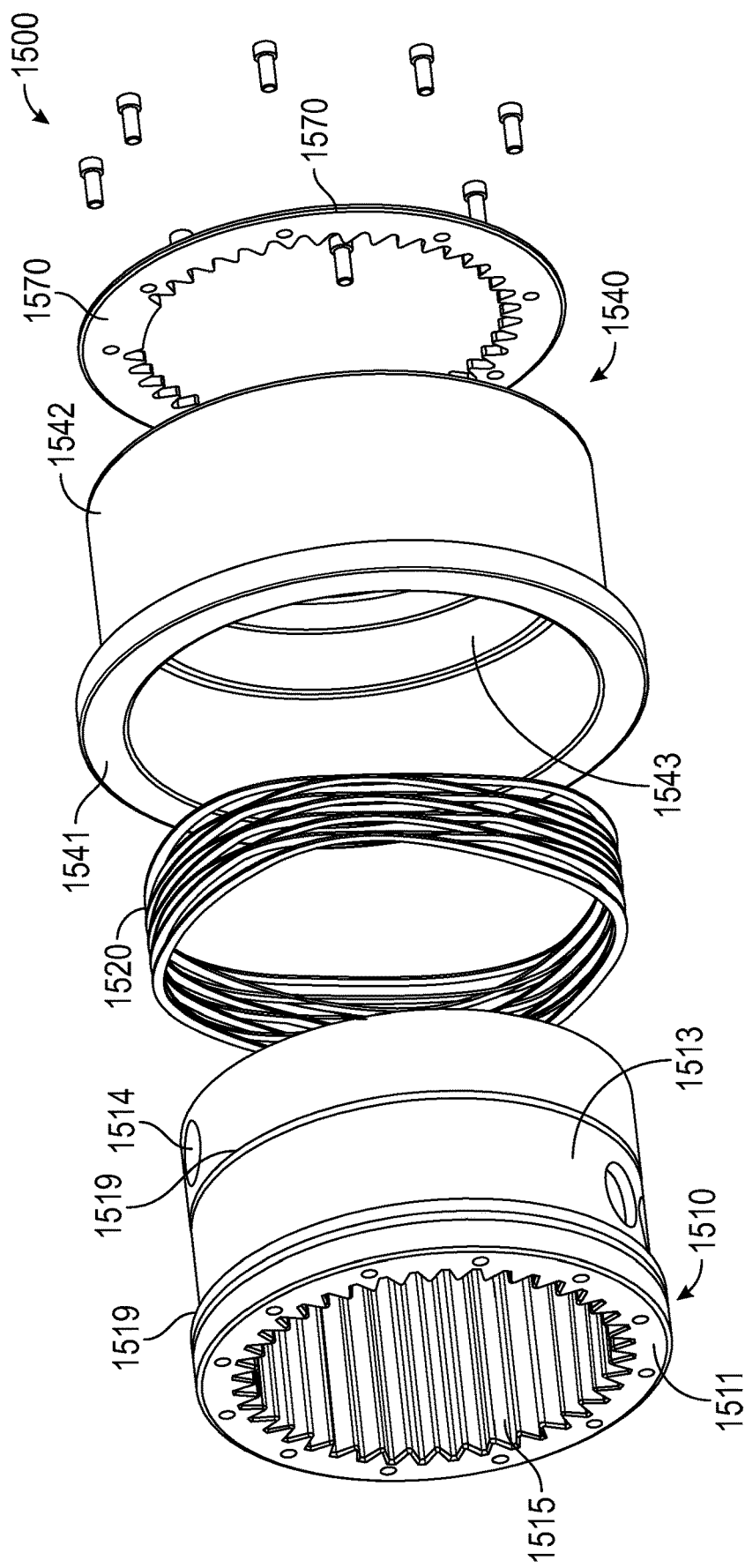
FIG. 9 is an exploded view of the coupling assembly of FIG. 4, wherein the coupling assembly comprises a spring-loaded locking sleeve and a drive-transfer cylinder.
Figure 10:
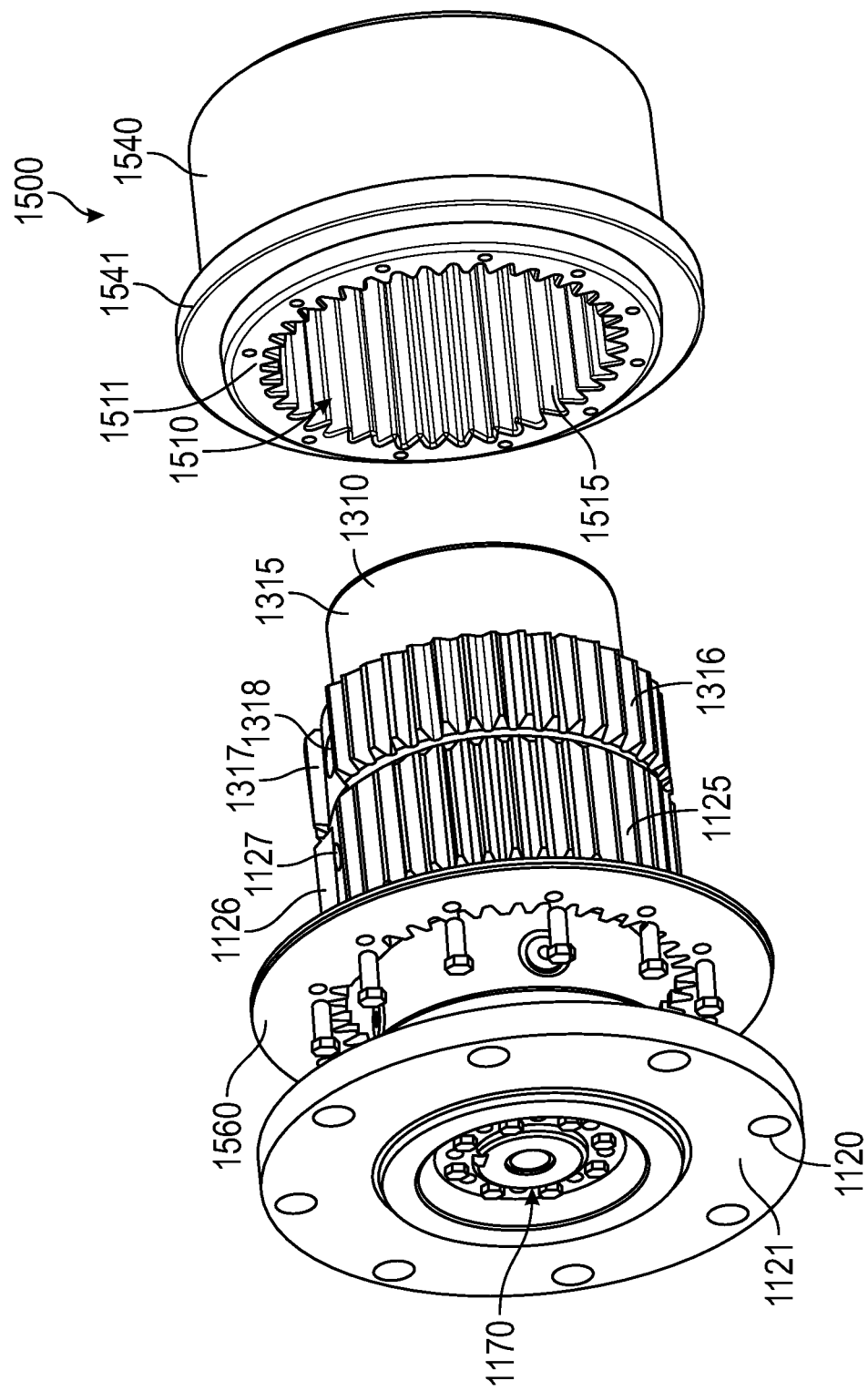
FIG. 10 is a partially-exploded view of the flange shaft, the stub shaft, and the coupling assembly.

Referring primarily to FIGS. 9 and 10, the coupling assembly 1500 comprises a first end plate 1560 and a second end plate, or masking plate, 1570. The first end plate 1560 is attached to the flange end 1511 of the drive-transfer cylinder 1510 and the second end plate 1560 is attached to the other end of the drive-transfer cylinder 1510. The first end plate 1560 and the second end plate 1570 comprise tooth profiles which are utilized to align the coupling assembly 1500 to the teeth 1125 of the flange shaft 1120 and the teeth 1316 of the stub shaft 1310. After the coupling assembly 1500 is slid onto the shafts 1120, 1310, the first end plate 1560 is rotated half of a circular pitch and is affixed to the flange end 1511 so that the coupling assembly 1500 cannot be pulled off of the shafts 1120, 1310 owing to interference between the teeth of the first end plate 1560 and the teeth 1125 of the flange shaft 1120. This half of a circular pitch rotation provides a positive axial stop for the coupling assembly 1500 toward the output shaft assembly 1300. The second end plate 1570 also comprises a matching tooth profile to the teeth 1125 and the teeth 1316; however, the second end plate 1570 is aligned such that the second end plate 1570 can be slide over the teeth 1316 and onto the teeth 1125, discussed in detail below.

In at least one instance, the tooth profile of the second end plate 1570 comprises loosely cut teeth as compared to the teeth 1316, 1125 so as to provide a tapered engagement between the second end plate 1570 and the teeth 1316, 1125. This tapered engagement may eliminate the possibility of the coupling assembly 1500 from getting stuck during assembly and/or during movement of the second end plate 1570 onto/off of the teeth 1316, 1125. In other words, the loosely cut tooth profile aids in engagement of the second end plate 1570 with the teeth 1316, 1125 during movement of the coupling assembly 1500 between the drivingly-engaged position and the drivingly-disengaged position. In at least one instance, a snap ring is utilized in addition to, or in lieu of, the second end plate 1570.

The spring-loaded locking sleeve 1540 is movable between the locked position and the unlocked position. In the locked position, the spring-loaded locking sleeve 1540 holds the coupling assembly 1500 to the flange shaft 1120 and the stub shaft 1310 by way of a ball and detent locking mechanism. A ball 1550 is biased toward detent 1318 when the coupling assembly 1500 is in the drivingly-engaged position and toward detent 1127 when the coupling assembly is in the drivingly-disengaged position.

Figure 11:
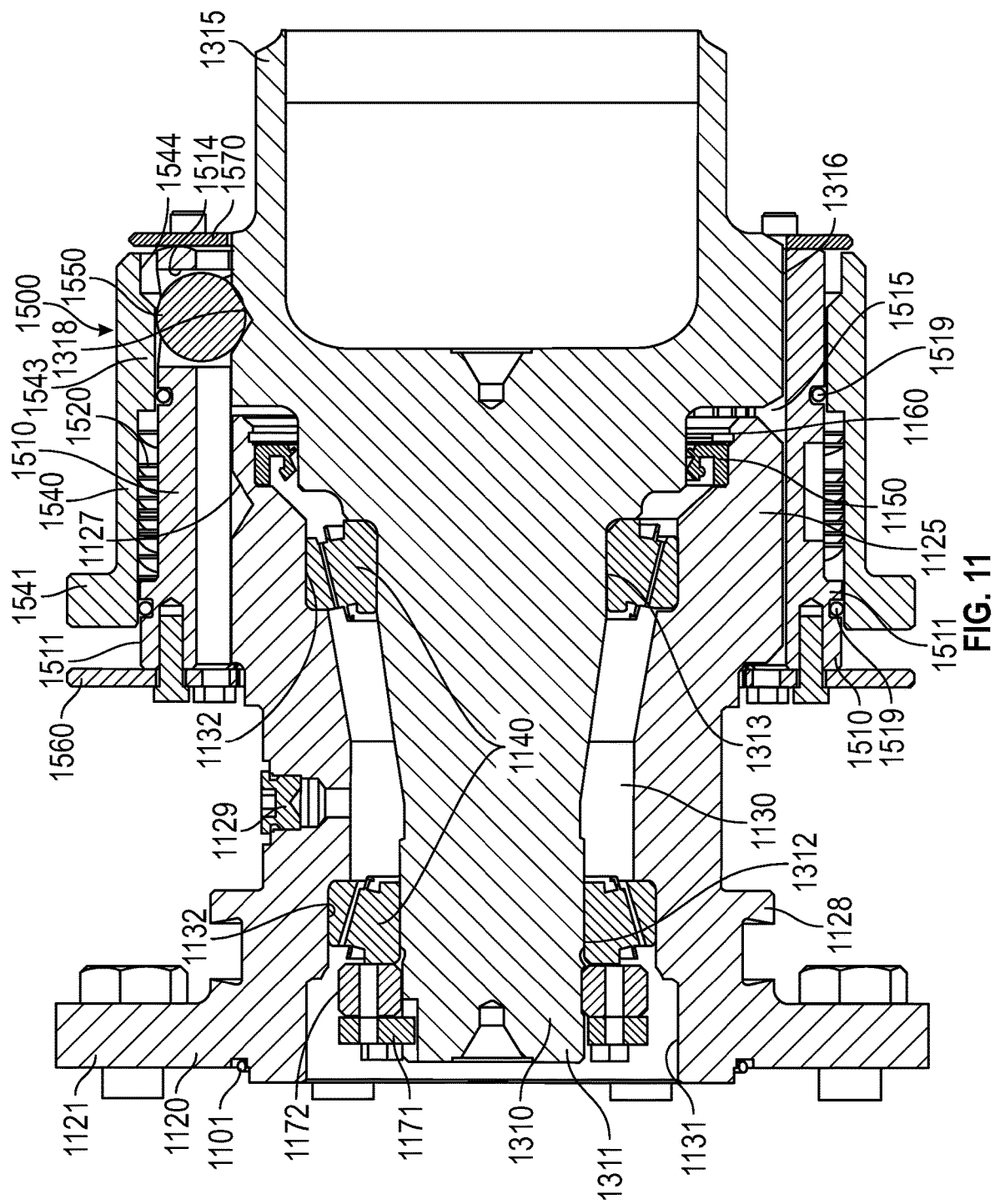
FIG. 11 is a cross-sectional view of the flanged shaft, the stub shaft, and the coupling assembly of the driveline assembly of FIG. 4, wherein the coupling assembly is illustrated in the drivingly-engaged and locked position.

Referring primarily to FIG. 11, the ball 1550 free to move when the spring-loaded locking sleeve 1540 is moved into the unlocked position where an annular channel 1544 defined in the spring-loaded locking sleeve 1540 is configured to provide space for the ball 1550 to move up and out of the detents 1318, 1127. The ball 1550 is positioned within an aperture 1514 defined in the drive-transfer cylinder 1510 which is configured to longitudinally and rotationally restrain the position of the ball 1550 relative to the drive-transfer cylinder 1510. The drive-transfer cylinder 1510 is configured to move the ball 1550 from detent 1318 to detent 1127 and back to detent 1318. To lock the coupling assembly 1500 in either the drivingly-disengaged position or the drivingly-engaged position, the spring-loaded locking sleeve 1540 is released so that the ball 1550 is urged into its respective detent 1127, 1318 by the spring-loaded locking sleeve 1540. When locked, the inner surface of the driving annular tab 1543 of the spring-loaded locking sleeve 1540 vertically constrains, or locks, the ball 1550 into the respective detent 1127, 1318.

Operation of the coupling assembly 1500 will now be described in connection with FIGS. 11-13. As can be seen in FIG. 11, the coupling assembly 1500 is in the drivingly-engaged and locked position where rotary drive motion of the input shaft assembly 1100 is transferred to the output shaft assembly 1300 and the coupling assembly 1100 is locked. When locked, the coupling assembly 1500 cannot inadvertently move relative to the input and output shaft assemblies 1100, 1300. This ensures that the coupling assembly 1500 stays in the intended position. Notably, the coupling assembly 1500 rotates with the input and output shaft assemblies 1100, 1300 while in the drivingly-engaged position.

Should a pump to which the output shaft assembly 1300 is connected fail, for example, actuation of the coupling assembly 1500 may be desired to decouple, or rotationally unlock, the input shaft assembly 1100 and the output shaft assembly 1300 relative to each other. To decouple the output shaft assembly 1300 and the input shaft assembly 1100, the spring-loaded locking sleeve 1540 is pressed toward the first end plate 1560 so as to compress the spring 1520. When the spring-loaded locking sleeve 1540 is pressed against the first end plate 1560, the ball 1550 is free to move vertically within the aperture 1514 and into the annular channel 1544. At this point, the force is further applied in the same direction toward the flange 1121 to the spring-loaded locking sleeve 1540 to slide the entire coupling assembly 1500 relative to the stub shaft 1310 and the flange shaft 1120. Sufficient longitudinal travel of the coupling assembly 1500 decouples the stub shaft 1310 and the flange shaft 1120 (FIG. 12). In at least one instance, longitudinal travel of the coupling assembly 1500 in this direction is limited by a limiting flange 1128 of the flange shaft 1120.

Figure 12:
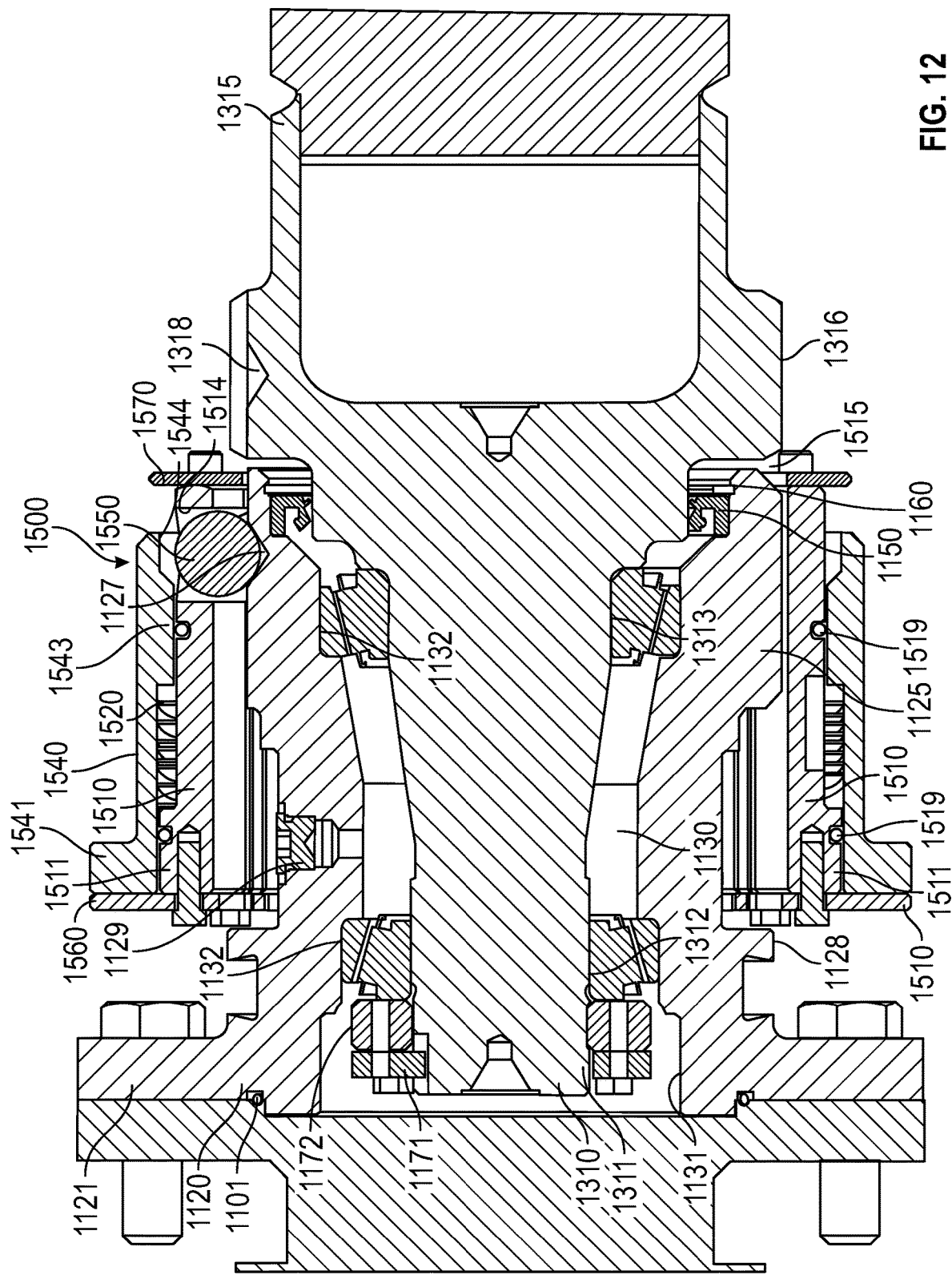
FIG. 12 is a cross-sectional view of the flanged shaft, the stub shaft, and the coupling assembly of the driveline assembly of FIG. 4, wherein the coupling assembly is illustrated in the drivingly-disengaged and unlocked position.

As can be seen in FIG. 12, the spring-loaded locking sleeve 1540 is illustrated in the unlocked position. To lock the spring-loaded locking sleeve 1540 and, thus, the coupling assembly 1500 relative to the input shaft assembly 1100 and the output shaft assembly 1300 in the drivingly-disengaged position, pressure is released from the spring-loaded locking sleeve 1540 so that the spring 1520 can bias the spring-loaded locking sleeve 1540 toward its locked position. When locked, the spring-loaded locking sleeve 1540 holds the ball 1550 in the detent 1127, thereby locking the coupling assembly 1500 in the drivingly-disengaged position (FIG. 13).

Figure 13:
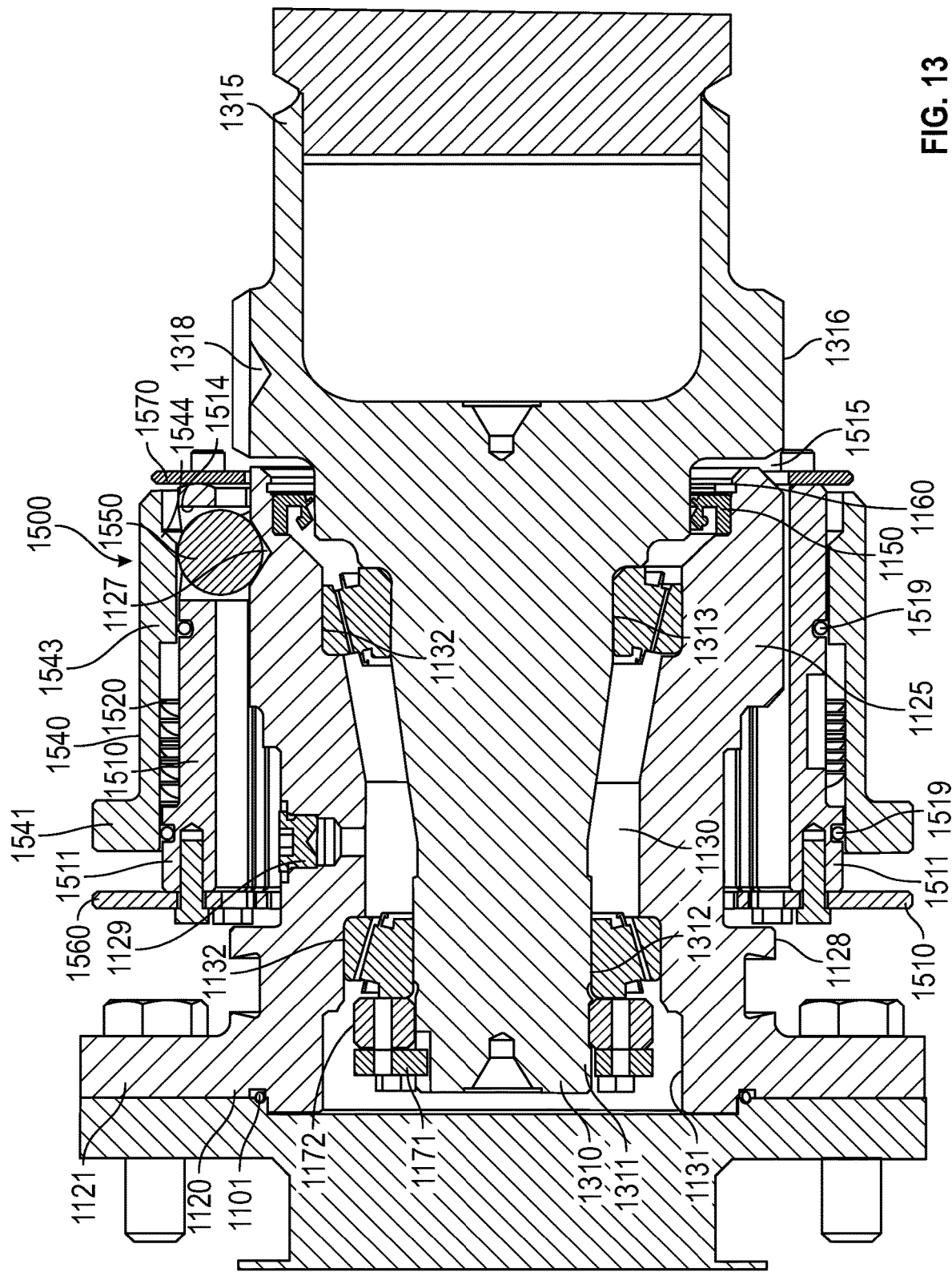
FIG. 13 is a cross-sectional view of the flanged shaft, the stub shaft, and the coupling assembly of the driveline assembly of FIG. 4, wherein the coupling assembly is illustrated in the drivingly-disengaged and locked position.

When in the drivingly-disengaged position illustrated in FIG. 13, relative rotation between the stub shaft 1310 and the flange shaft 1120 is permitted by way of the bearings 1140. In at least one instance, the input shaft assembly 1100 is coupled to a motor and, thus, the flange shaft 1120 rotates relative to the stub shaft 1310. Notably, rotation of the input shaft assembly 1100 causes the coupling assembly 1500 to rotate with the input shaft assembly 1100 relative to the output shaft assembly 1300.

To move the coupling assembly 1500 back into the drivingly-engaged position (FIG. 11), the spring-loaded locking sleeve 1540 is, once again, compressed against the flange end 1511 of the drive-transfer cylinder 1510 so as to unlock the ball 1550. As this point, while holding the spring-loaded locking sleeve 1540 in the unlocked position, the coupling assembly 1500 is moved back, toward the teeth 1316 of the stub shaft 1310 until the ball 1550 falls into the detent 1318. After the ball 1550 is in the detent 1318, the spring-loaded locking sleeve 1540 is released to lock the coupling assembly 1500 to the stub shaft 1310 and the flange shaft 1120.

Various types of shafts are described herein. In at least one instance, gear teeth are utilized to provide driving interfaces between components. In at least one instance, splined shafts are utilized in addition to, or in lieu of, gear teeth.

In at least one instance, input motion is stopped prior to actuating the coupling assembly. In at least one instance, the coupling assembly is actuated while the driveline assembly is rotating. In at least one instance, decoupling the input shaft assembly and the output shaft assembly while the driveline assembly is transmitting motion from the motor to the pump is utilized in an emergency to disconnect the pump from the motor.

In at least one instance, a set screw is installed radially through the drive-transfer cylinder in addition to, or in lieu of, the ball and detent system. In such an instance, corresponding set screw apertures to receive the set screw when the coupling assembly is in the drivingly-engaged position and the drivingly-disengaged position are defined in the flange shaft and the stub shaft.

In at least one instance, the slots defined in the teeth profiles of the flange shaft and the stub shaft are utilized for alignment during assembly. Further to the above, corresponding profiles can be utilized in the end plates and/or drive-transfer cylinder to align the end plates and/or drive-transfer cylinder with the flange shaft and stub shaft during assembly. Such an arrangement can ensure in maintaining a balanced driveline shaft assembly.

In at least one instance, the gear profiles allow for assembly in only one rotational position. In at least one instance, the gear profiles allow for assembly in two rotational positions 180 degrees apart from each other. In such an instance, each gear profile would comprise two slots instead of one, opposing each other 180 degrees, so as to permit assembly of the components in two rotational positions.

In at least one instance, an coupling assembly is provided which is spring-loaded toward a drivingly-disengaged position and held in a drivingly-engaged position by a fusible link. The fusible link can be configured to shear in an over-torque application thereby allowing the coupling assembly to automatically move into the drivingly-disengaged position without the need for manual actuation thereof.

In at least one instance, a detent collar is utilized to secure the drive-transfer cylinder in the drivingly-engaged position, the drivingly-disengaged position, or both the drivingly-engaged position and the drivingly-disengaged position.

In at least one instance, one or more sensors are utilized to determine the position of the coupling assembly. The sensor outputs can indicate when an actuator of the coupling assembly should be released. In at least one instance, the driveline assembly is operated with the actuator disengaged from the coupling assembly when the coupling assembly is in the drivingly-disengaged position or the drivingly-engaged position. In other words, the actuator is not in contact with the coupling assembly in either operational position (the drivingly-disengaged position and the drivingly-engaged position). This may prevent unnecessary wear on components when operating in either position due to frictional engagement, for example.

In at least one instance, moving the coupling assembly back into a drivingly-engaged position from a drivingly-disengaged position is required to be manually performed so as to not accidentally try to recouple the motor and the pump while the motor is driving the input shaft assembly.

In at least one instance, one or more of the coupling assemblies disclosed herein are incorporated directly in a driveline assembly coupling drive motion between an input and an output such as, for example, a motor output and a pump input. The driveline assembly transmits rotary drive motion between the motor and the pump. In at least one instance, universal joints on each end of the driveline assembly allow the driveline assembly to be out of axial alignment with the input and the output. Providing the coupling and/or decoupling function directly in the driveline assembly eliminates the need for the coupling assembly to be axially aligned to the input and/or the output. In at least one instance, providing the coupling and/or decoupling function directly in the driveline assembly eliminates the need for the motor output and the pump input to be axially aligned, or concentric, for example. In other words, the output, the input, and/or the coupling assembly can be non-collinear.

In at least one instance, the coupling assembly is actuated to decouple rotary drive motion between a pump and a motor when the motor is not driving the pump. In otherwords, the coupling assembly can be actuated to decouple rotary drive motion between the pump and the motor when the motor and pump are not running.

In at least one instance, the actuator to actuate the coupling assembly is remotely controlled. In at least one instance, the actuator for actuating the coupling assembly is remotely controlled to decouple rotary drive motion with the coupling assembly while re-coupling rotary drive motion with the coupling assembly is performed manually. In at least one instance, both coupling and decoupling can be performed by a single actuator. In at least one instance, one actuator is provided to couple rotary drive motion with the coupling assembly and one actuator is provided to decouple rotary drive motion with the coupling assembly.

Examples of the above embodiments include:

Example 1 is a driveline assembly for use with a well-servicing pump system comprising a motor and a pump. The driveline assembly comprises a stub shaft attachable to one of the pump or the motor, a flange shaft attachable to the other of the pump or the motor, the flange shaft comprising a hollow core configured to receive and journably support the stub shaft, and a coupling assembly comprising a drive-transfer cylinder movable relative to the flange shaft and the stub shaft between a drivingly-engaged position and a drivingly-disengaged position and a spring-loaded locking sleeve slidable between an unlocked position and a locked position. In the drivingly-engaged position, rotary drive motion of the motor is transferred to the pump through the driveline assembly. In the unlocked position, the locking sleeve allows the drive-transfer cylinder to move axially from the drivingly-engaged position where the drive-transfer cylinder connects and transfers rotary drive between the flange shaft and the stub shaft to the drivingly-disengaged position where the drive-transfer sleeve disconnects and allows relative rotation between the flange shaft and the stub shaft. In the locked position, the locking sleeve locks the drive-transfer cylinder in one of either the drivingly-engaged position or the drivingly-disengaged position.

In Example 2, the embodiments of any preceding paragraph or combination thereof further include the stub shaft comprises first driving teeth formed on a body outer surface, the flange shaft comprises second driving teeth formed on an end portion outer surface, the drive-transfer cylinder comprises third driving teeth formed on an inner bore, and the third driving teeth are configured to meshingly engage both the first driving teeth and the second driving teeth when the drive-transfer cylinder is in the drivingly-engaged position to transfer rotary drive between the flange shaft and the stub shaft.

In Example 3, the embodiments of any preceding paragraph or combination thereof further include the coupling assembly further comprises a ball-and-detent locking system configured lock the drive-transfer cylinder relative to the flange shaft and the stub shaft in the drivingly-engaged position and the drivingly-disengaged position.

In Example 4, the embodiments of any preceding paragraph or combination thereof further include the ball-and-detent locking system comprises a first detent defined in the flange shaft, a second detent defined in the stub shaft, and a ball configured to be received within the first detent when the drive-transfer cylinder is in the drivingly-disengaged position and the second detent when the drive-transfer cylinder is in the drivingly-engaged position.

In Example 5, the embodiments of any preceding paragraph or combination thereof further include an actuator configured to engage the spring-loaded locking sleeve to move the spring-loaded locking sleeve from the locked position to the unlocked position.

In Example 6, the embodiments of any preceding paragraph or combination thereof further include an electrically-activated linear actuator.

In Example 7, the embodiments of any preceding paragraph or combination thereof further include the coupling assembly further comprises a wave spring configured to bias the spring-loaded locking sleeve toward the locked position.

In Example 8, the embodiments of any preceding paragraph or combination thereof further include the coupling assembly further comprises a first end plate fixedly attached to a first end of the drive-transfer cylinder and configured to limit longitudinal travel of the coupling assembly and a second end plate fixedly attached to a second end of the drive-transfer cylinder.

In Example 9, the embodiments of any preceding paragraph or combination thereof further include a first Cardan universal joint attached to the flange shaft and a second Cardan universal joint attached to the stub shaft.

Example 10 is a well-servicing pump system. The well-servicing pump system comprises a first pump, a motor, an actuator, and a driveline assembly configured to selectively transfer rotary drive motion from the motor to the first pump. The driveline assembly comprises a flange shaft, a stub shaft, and a coupling assembly actuatable by the actuator to selectively decouple the stub shaft and the flange shaft. The coupling assembly comprises a drive-transfer cylinder movable between and engaged position and a drivingly-disengaged position, wherein the drive-transfer cylinder transfers rotary drive motion from the stub shaft to the flange shaft when the drive-transfer cylinder is in the drivingly-engaged position, and wherein the drive-transfer cylinder permits relative rotation between the stub shaft and the flange shaft when the drive-transfer cylinder is in the drivingly-disengaged position. The coupling assembly further comprises a locking sleeve movable between an unlocked position to permit movement of the drive-transfer cylinder between the drivingly-engaged position and the drivingly-disengaged position and a locked position to prevent movement of the drive-transfer cylinder between the drivingly-engaged position and the drivingly-disengaged position.

In Example 11, the embodiments of any preceding paragraph or combination thereof further include a second pump and wherein the motor comprises a double-ended motor shaft configured to drive the first pump and the second pump.

In Example 12, the embodiments of any preceding paragraph or combination thereof further include the coupling assembly further comprises a ball-and-detent locking system configured lock the coupling assembly relative to the flange shaft and the stub shaft in the drivingly-engaged position and the drivingly-disengaged position.

In Example 13, the embodiments of any preceding paragraph or combination thereof further include the ball-and-detent locking system comprises a first detent defined in the stub shaft, a second detent defined in the flange shaft, and a ball configured to be received within the first detent when the drive-transfer cylinder is in the drivingly-disengaged position and the second detent when the drive-transfer cylinder is in the drivingly-engaged position.

In Example 14, the embodiments of any preceding paragraph or combination thereof further include the actuator comprises an electrically-activated linear actuator.

In Example 15, the embodiments of any preceding paragraph or combination thereof further include the coupling assembly further comprises a wave spring configured to bias the locking sleeve toward the locked position.

In Example 16, the embodiments of any preceding paragraph or combination thereof further include the stub shaft further comprises a first Cardan universal joint coupled to the motor and the flange shaft further comprises a second Cardan universal joint coupled to the first pump.

Example 17 is a method for operating a well-servicing pump system. The method comprises moving a spring-loaded locking sleeve toward a flange of a drive-transfer cylinder to unlock the drive-transfer cylinder, moving the drive-transfer cylinder to a drivingly-disengaged position from a drivingly-engaged position, wherein drive motion is not transferred from a motor to a pump when the drive-transfer cylinder is in the drivingly-disengaged position, and wherein drive motion is transferred from the motor to the pump when the drive-transfer cylinder is in the drivingly-engaged position, and releasing the spring-loaded locking sleeve to lock the drive-transfer cylinder in the drivingly-disengaged position.

In Example 18, the embodiments of any preceding paragraph or combination thereof further include moving the drive-transfer cylinder to the drivingly-disengaged position comprising moving the drive-transfer cylinder in a first direction. The method further comprises moving the spring-loaded locking sleeve toward the flange of the drive-transfer cylinder to unlock the drive-transfer cylinder, moving the drive-transfer cylinder in a second direction opposite the first direction to the drivingly-engaged position, and releasing the spring-loaded locking sleeve to lock the drive-transfer cylinder in the drivingly-engaged position.

In Example 19, the embodiments of any preceding paragraph or combination thereof further include moving the spring-loaded locking sleeve comprises moving the spring-loaded locking sleeve with an actuator arm.

In Example 20, the embodiments of any preceding paragraph or combination thereof further include releasing the spring-loaded locking sleeve comprises disengaging the actuator arm from the spring-loaded locking sleeve.

Certain terms are used throughout the description and claims to refer to particular features or components. As one skilled in the art will appreciate, different persons may refer to the same feature or component by different names. This document does not intend to distinguish between components or features that differ in name but not function.

While descriptions herein may relate to "comprising" various components or steps, the descriptions can also "consist essentially of" or "consist of" the various components and steps.

Unless otherwise indicated, all numbers expressing quantities are to be understood as being modified in all instances by the term "about" or "approximately". Accordingly, unless indicated to the contrary, the numerical parameters are approximations that may vary depending upon the desired properties of the present disclosure. As used herein, "about", "approximately", "substantially", and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus 10% of the particular term and "substantially" and "significantly" will mean plus or minus 5% of the particular term.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A well-servicing pump system, comprising:
    a first pump;
    a motor;
    an actuator; and
    a driveline assembly configured to selectively transfer rotary drive motion from the motor to the first pump, wherein the driveline assembly comprises:
        a flange shaft;
        a stub shaft; and
        a coupling assembly actuatable by the actuator to selectively decouple the stub shaft and the flange shaft, wherein the coupling assembly comprises:
            a drive-transfer cylinder movable between a drivingly-engaged position and a drivingly-disengaged position, wherein the drive-transfer cylinder transfers the rotary drive motion from the stub shaft to the flange shaft when the drive-transfer cylinder is in the drivingly-engaged position, and wherein the drive-transfer cylinder permits relative rotation between the stub shaft and the flange shaft when the drive-transfer cylinder is in the drivingly-disengaged position;
            a locking sleeve movable between an unlocked position to permit movement of the drive-transfer cylinder between the drivingly-engaged position and the drivingly-disengaged position and a locked position to prevent the movement of the drive-transfer cylinder between the drivingly-engaged position and the drivingly-disengaged position; and
            a ball-and-detent locking system configured to lock the coupling assembly relative to the flange shaft and the stub shaft in the drivingly-engaged position and the drivingly-disengaged position, wherein the ball-and-detent locking system comprises: a first detent defined in the stub shaft; a second detent defined in the flange shaft; and
                a ball configured to be received within the first detent when the drive-transfer cylinder is in the drivingly-disengaged position, and received within the second detent when the drive-transfer cylinder is in the drivingly-engaged position.

2. The well-servicing pump system of claim 1, further comprising a second pump and wherein the motor comprises a double-ended motor shaft configured to drive the first pump and the second pump.

3. The well-servicing pump system of claim 1, wherein the actuator comprises an electrically-activated linear actuator.

4. The well-servicing pump system of claim 1, wherein the coupling assembly further comprises a wave spring configured to bias the locking sleeve toward the locked position.

5. The well-servicing pump system of claim 1, wherein the stub shaft further comprises a first Cardan universal joint coupled to the motor, and the flange shaft further comprises a second Cardan universal joint coupled to the first pump.

\* \* \* \* \*